US012637017B2

(12) United States Patent
Chen Lee et al.

(10) Patent No.: US 12,637,017 B2
(45) Date of Patent: May 26, 2026

(54) QUICK-RELEASE STRUCTURE AND VEHICLE REAR SEAT DISPLAY MODULE USING THE SAME

(71) Applicant: Jet Optoelectronics Co., Ltd., Taipei City (TW)

(72) Inventors: Yu-Feng Chen Lee, Taipei City (TW); Sheng-Yueh Lin, Taipei City (TW)

(73) Assignee: Jet Optoelectronics Co., Ltd., Taipei City (TW)

( * ) Notice: Subject to any disclaimer, the term of this patent is extended or adjusted under 35 U.S.C. 154(b) by 148 days.

(21) Appl. No.: 18/794,487

(22) Filed: Aug. 5, 2024

(65) Prior Publication Data

US 2025/0065817 A1    Feb. 27, 2025

(30) Foreign Application Priority Data

Aug. 24, 2023    (TW) ................................. 112131940

(51) Int. Cl.
  B60R 11/02       (2006.01)
  B60R 11/00       (2006.01)
(52) U.S. Cl.
  CPC ... B60R 11/0235 (2013.01); B60R 2011/0012 (2013.01); B60R 2011/0078 (2013.01)
(58) Field of Classification Search
  CPC .................................................. B60R 11/0235

USPC .......................................... 297/188.05, 217.3
See application file for complete search history.

(56) References Cited

U.S. PATENT DOCUMENTS

| | | | | |
|---|---|---|---|---|
| 9,611,881 | B2 * | 4/2017 | Khodapanah | ........... F16B 21/06 |
| 2013/0303000 | A1 * | 11/2013 | Witter | ................... F16L 37/004 |
| | | | | 403/324 |
| 2014/0265765 | A1 * | 9/2014 | Khodapanah | .......... F16M 13/00 |
| | | | | 248/224.8 |
| 2025/0009093 | A1 * | 1/2025 | Zhang | .................... A45C 11/00 |

FOREIGN PATENT DOCUMENTS

CN            218268101 U   *   1/2023

* cited by examiner

*Primary Examiner* — Anthony D Barfield
(74) *Attorney, Agent, or Firm* — Wang Law Firm, Inc.

(57) ABSTRACT

A quick-release structure and a vehicle rear seat display module using the same are provided. The quick-release structure includes a display docking piece, a fixing bracket docking piece, and a connecting hinge. The display docking piece and the fixing bracket docking piece may move relatively through the connecting hinge, so that a display fixed on the quick-release structure may be adjusted in pitch angle. In addition, the display docking piece also has a rotating mechanism, which makes a display rotate from a horizontal direction to a vertical direction.

13 Claims, 12 Drawing Sheets

QUICK-RELEASE STRUCTURE AND VEHICLE REAR SEAT DISPLAY MODULE USING THE SAME

CROSS-REFERENCE TO RELATED APPLICATION

This application claims priority from Taiwan Patent Application No. 112131940, filed on Aug. 24, 2023, in the Taiwan Intellectual Property Office, the content of which is hereby incorporated by reference in its entirety for all purposes.

BACKGROUND OF THE INVENTION

1. Field of the Invention

The present disclosure relates to a quick-release structure and a display module using the same, particularly to a quick-release structure and vehicle rear seat display module using the same.

2. Description of the Related Art

With the advancement of technology and the demand of human beings for audio-visual entertainment, all kinds of display-related audio-visual equipment have been widely used in homes, companies, public places, medium and large-sized vehicles, airplanes, cruise ships, etc. During the commute to work or long-distance travel, to pass a long period of boredom on the transportation system, there already have been entertainment devices to entertain passengers, such as stereos or displays. These devices are provided for passengers to listen to music or watch movies, etc., in order to pass the time when taking the transportation.

However, displays disposed on the back seats of vehicles in general are usually placed horizontally. Nowadays, due to the emergence of mobile entertainment, videos in a vertical direction and mobile phone mirroring images are viewed vertically, so the screen size on the display is rather small when presented horizontally. In addition, the conventional vehicle rear seat displays are always locked in a fixed position, which makes it difficult for users to manually operate, let alone read confidential information or watch videos. Moreover, it is difficult to avoid being viewed by surrounding passengers when the users watch videos, thus requiring the need for the improvement of users' privacy.

In summary, there is a need to develop a quick-release structure that may allow the rotating and detaching of the vehicle rear seat display to solve the aforementioned problems.

SUMMARY OF THE INVENTION

In view of the aforementioned conventional problems, the present disclosure provides a quick-release structure and vehicle rear seat display module using the same, which comes with a rotating function and allows the removal of a vehicle rear seat display.

The first purpose of the present disclosure is to provide a quick-release structure. The quick-release structure includes a display docking piece, a fixing bracket docking piece, and a connecting hinge. The connecting hinge is disposed between the display docking piece and the fixing bracket docking piece, so that the display docking piece and the fixing bracket docking piece are moved relative to each other.

The display docking piece includes a release button, a cross-convex part, a plurality of buckles, a plurality of first gears, a second gear, a rotating mechanism and a fixed shaft, and the display docking piece includes a front housing and a rear housing, the rear housing is disposed between the front housing and the connecting hinge; wherein the release button may be removably disposed on the side of the front housing, and is interconnected with the second gear disposed at outside of internal of the front housing, the cross-convex part is disposed on another side of the front housing relative to the connecting hinge; the plurality of buckles are retractably and respectively disposed at four side ends of the cross-convex part, and respectively interconnected with the plurality of first gears disposed inside the front housing. The plurality of first gears are respectively meshed with the second gear, and thus when the release button is pulled to rotate the second gear, since the plurality of first gears and the second gear are meshed, the plurality of first gears and the second gear are linking-up with each other, in order to make the plurality of buckles in a retracted or extended state; the rotating mechanism is disposed inside the front housing and between the plurality of first gears and the rear housing, there is a circular cavity in the center of the rotating mechanism, and the fixed shaft is disposed on the rear housing, by interlocking the fixed shaft with the circular cavity at the center of the rotating mechanism, the front housing and the rear housing are interlocked with each other to form the display docking piece, and the rotating mechanism may rotate along the fixed shaft, which may further rotate the surface of the display docking piece where the cross-convex part is disposed.

The plurality of buckles are made of magnetic metal material, and the connecting hinge and the rotating mechanism may be formed of any conventional structure, the description of which shall not be repeated herein; the display docking piece is used to fix the display thereon, and the fixing bracket docking piece is used to fix the quick-release structure to the back of a vehicle seat.

Preferably, the quick-release structure is made of magnetic metal material, so that the display with a magnetic back cover may be further securely placed on the quick-release structure without easily falling off.

Preferably, a spring-type connector (POGO PIN) is further disposed on the cross-convex part, so that a display, also having a back cover of a spring-type connector, may be charged, used for data transmission, or used to operate in-vehicle equipment, after being secured to the display docking piece.

The present disclosure provides a vehicle rear seat display module. The vehicle rear seat display module includes the quick-release structure and the display as mentioned above, wherein the display includes a cross-snap slot, a plurality of recessed parts and a plurality of magnets, the cross-snap slot is disposed at the center of the back cover of the display, the plurality of recessed parts are disposed in sequence between each end of cross of the cross-snap slot and the back cover of the display, and the plurality of magnets are disposed at the inner side of the plurality of recessed parts, and the plurality of recessed parts serve as movement spaces for the buckles to retract.

After the display is interlocked with the cross-convex part of the display docking piece of the quick-release structure via the cross-snap slot, the display is fixed to the quick-release structure by attaching the plurality of magnets to the plurality of buckles at four side ends of the cross-convex part.

The pitch angle of the display may be adjusted via the connecting hinge of the quick-release structure. In addition, the rotating mechanism of the quick-release structure that may rotate along the fixed shaft is used to rotate the display fixed by the display docking piece, so that the display is changed from a horizontal placement to a vertical placement, thus improving the video viewing experience.

When the display is to be fixed with the quick-release mechanism, the cross-snap slot and the cross-convex part are interlocked with each other. When the cross-convex part is fully interlocked in the cross-snap slot, the plurality of buckles at the four side ends of the cross-convex part are attracted to make them in an expanded state via the magnetic force of the plurality of magnets at the inner side of the plurality of recessed parts, so as to fix the display on the quick-release mechanism.

When the display is to be removed from the quick-release mechanism, the release button is first flipped, so that the plurality of buckles are retracted into the cross-convex part; the cross-convex part is taken out from the cross-snap slot, so the display may be separated from the quick-release mechanism.

Preferably, the display may further include a pen slot and a stylus, the pen slot is disposed under the back cover of the display, and the stylus is removably disposed in the pen slot, so that the display may come with the function of document processing in addition to being used for video watching.

Preferably, the display may further include a ring magnet, and the ring magnet is disposed along the outer side of the cross-snap slot. The display may be placed on the quick-release structure more securely without easily falling off by using the ring magnet, or when the display is removed for use, the ring magnet is used to attach the display to other surfaces with a magnetic function, making it more convenient for users to use the display for multifunctional purposes.

Preferably, the display further includes an ambient light, and the ambient light is disposed along the peripheral edge of the back cover of the display; the ambient light may be used to enhance the user experience with different lighting effects according to usage scenarios.

Preferably, when the first spring-type connector is disposed on the cross-convex part on the quick-release mechanism, the second spring-type connector (POGO PIN) may be further disposed on the cross-snap slot of the display correspondingly, in order to charge the display, transmit data, or operate in-vehicle equipment using the display.

More preferably, any one or more of the pen slot, the stylus, the ring magnet, the ambient light, and the second spring-type connector may be disposed on the display either individually or simultaneously depending on the requirement.

The technical features of the present disclosure are to be illustrated in detail below with specific embodiments and accompanying drawings to make a person with ordinary skill in the art effortlessly understand the purposes, technical features, and advantages of the present disclosure.

BRIEF DESCRIPTION OF THE DRAWINGS

The exemplary embodiments of the present disclosure are to be more fully understood from the following detailed description and the accompanying drawings of various embodiments of the present disclosure, which, however, should not be regarded as limiting the present disclosure to particular embodiments, but are only used for illustrative and understanding purposes only.

DESCRIPTION OF THE PREFERRED EMBODIMENTS

To make the features, contents, and advantages as well as the effects achieved by the present disclosure clearly expressed, the present disclosure is to be described in detail in conjunction with the form of the accompanying drawings. In addition, the drawings herein are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

To make a more complete and clearer disclosure of the technical contents, the purpose of the present disclosure, and the effects achieved by the present disclosure, they are described in detail below. Please refer to the disclosed drawings and drawing numbers together.

Figure 1:
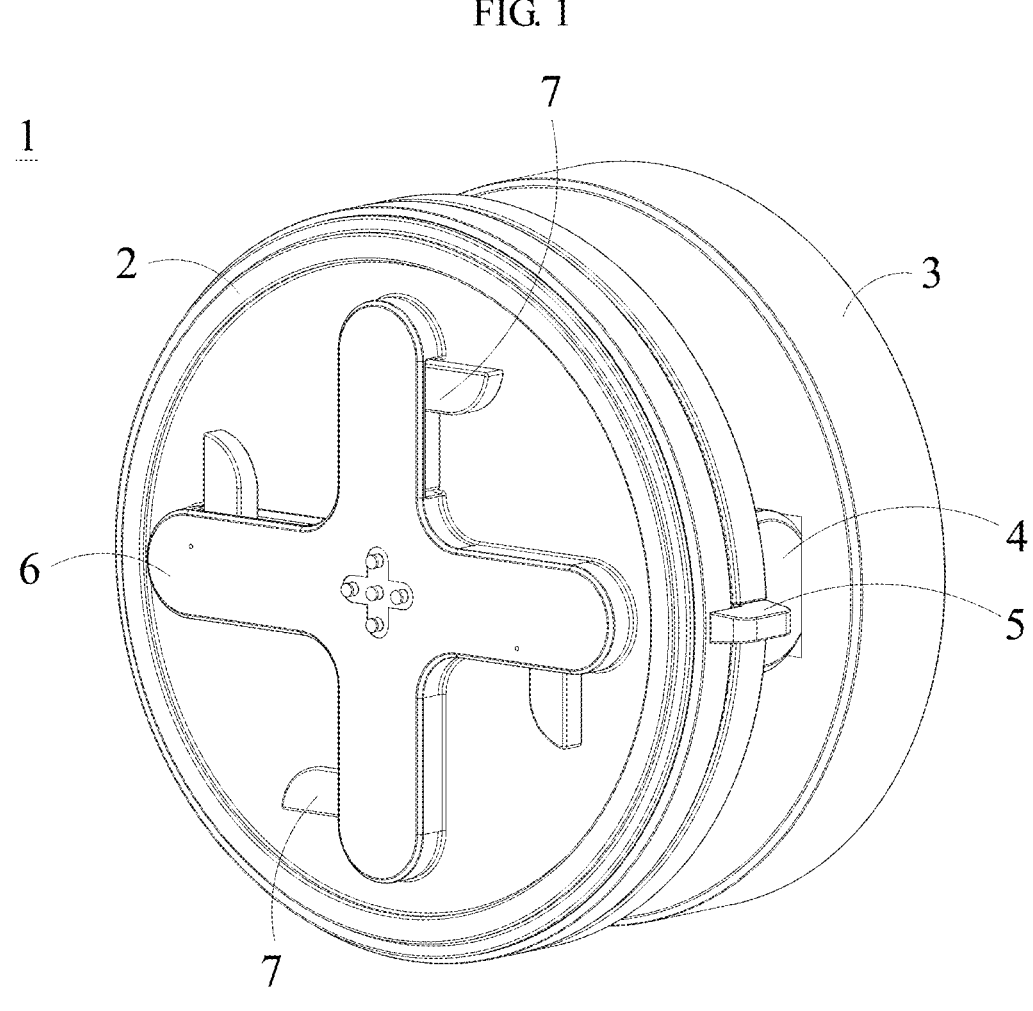
FIG. 1 is a schematic diagram of the quick-release structure according to the present disclosure.
Figure 2:
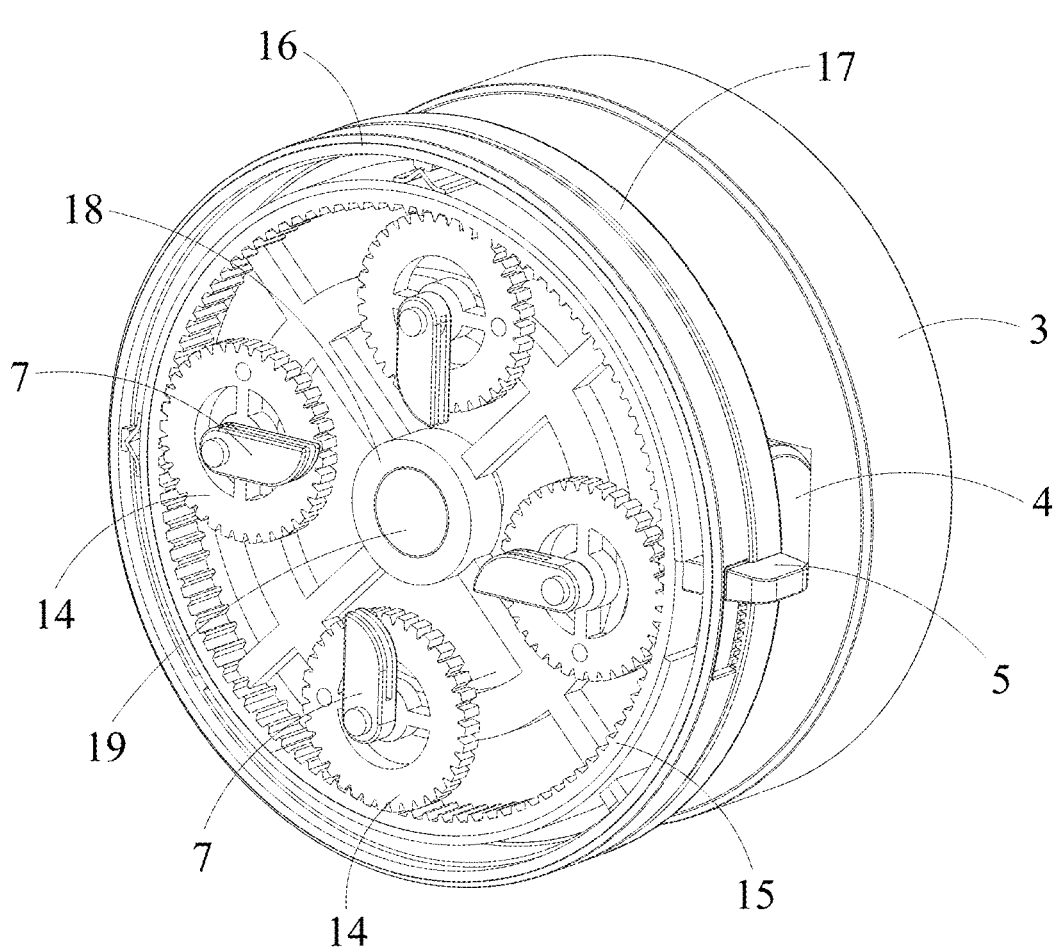
FIG. 2 is a perspective diagram of the quick-release structure according to the present disclosure.
Figure 3:
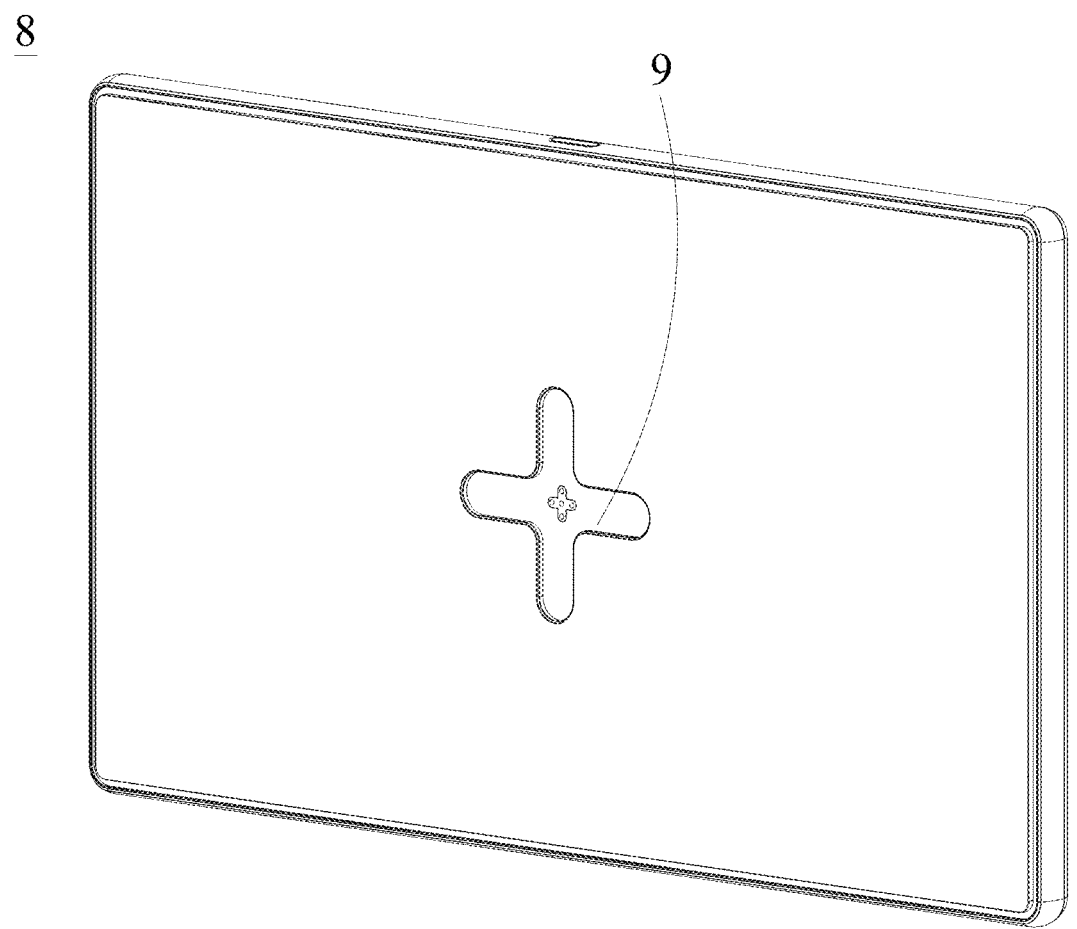
FIG. 3 is a rear view of the display in the vehicle rear seat display module according to the present disclosure.
Figure 4:
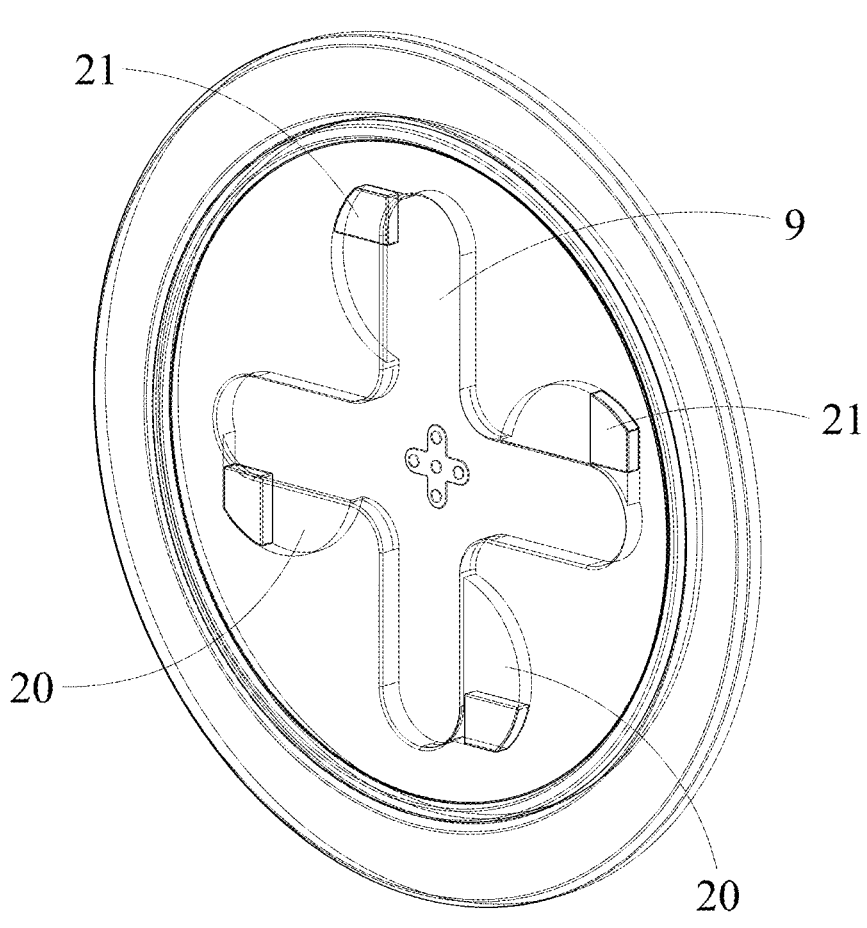
FIG. 4 is a perspective diagram of the cross-snap slot on the back surface of the display in the vehicle rear seat display module according to the present disclosure.
Figure 5:
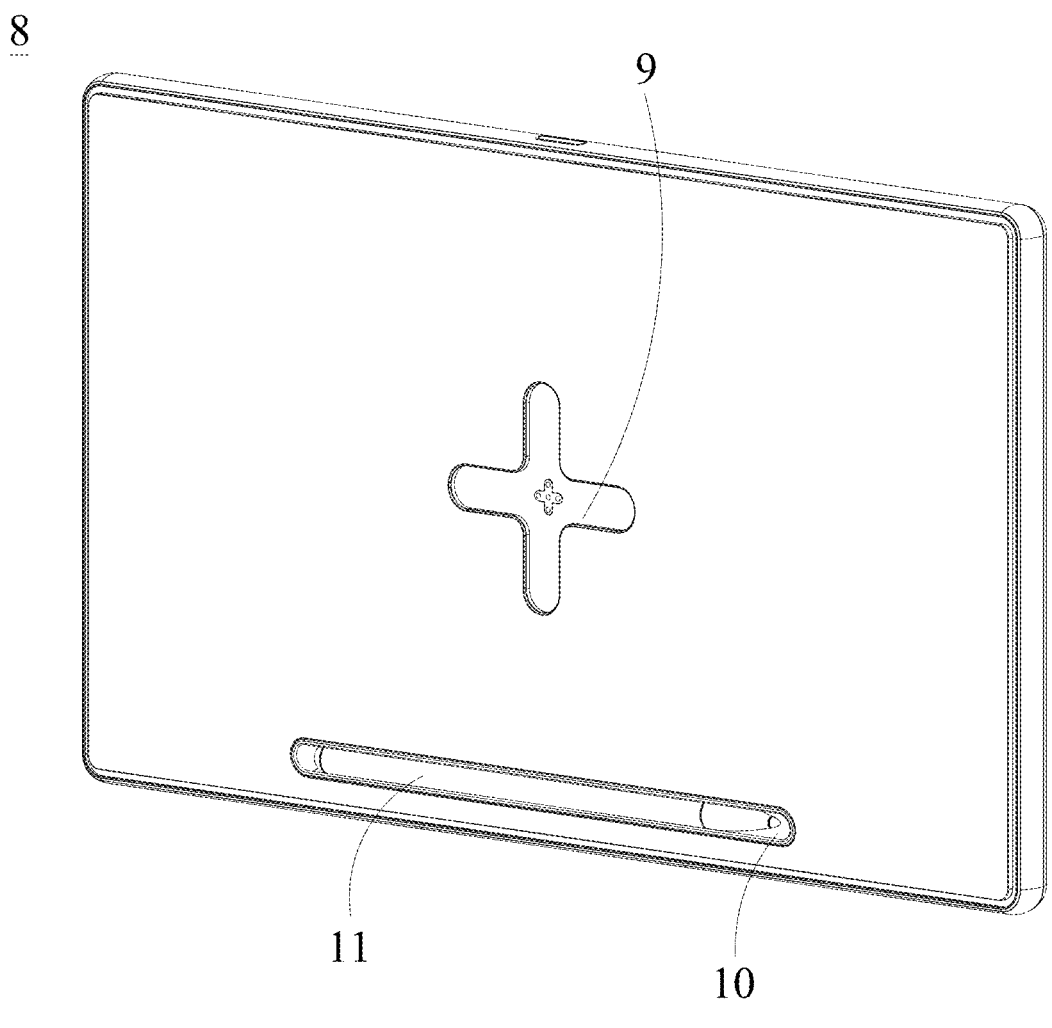
FIG. 5 is a schematic diagram in which the display is further disposed with a pen slot and a stylus in the vehicle rear seat display module according to the present disclosure.
Figure 6:
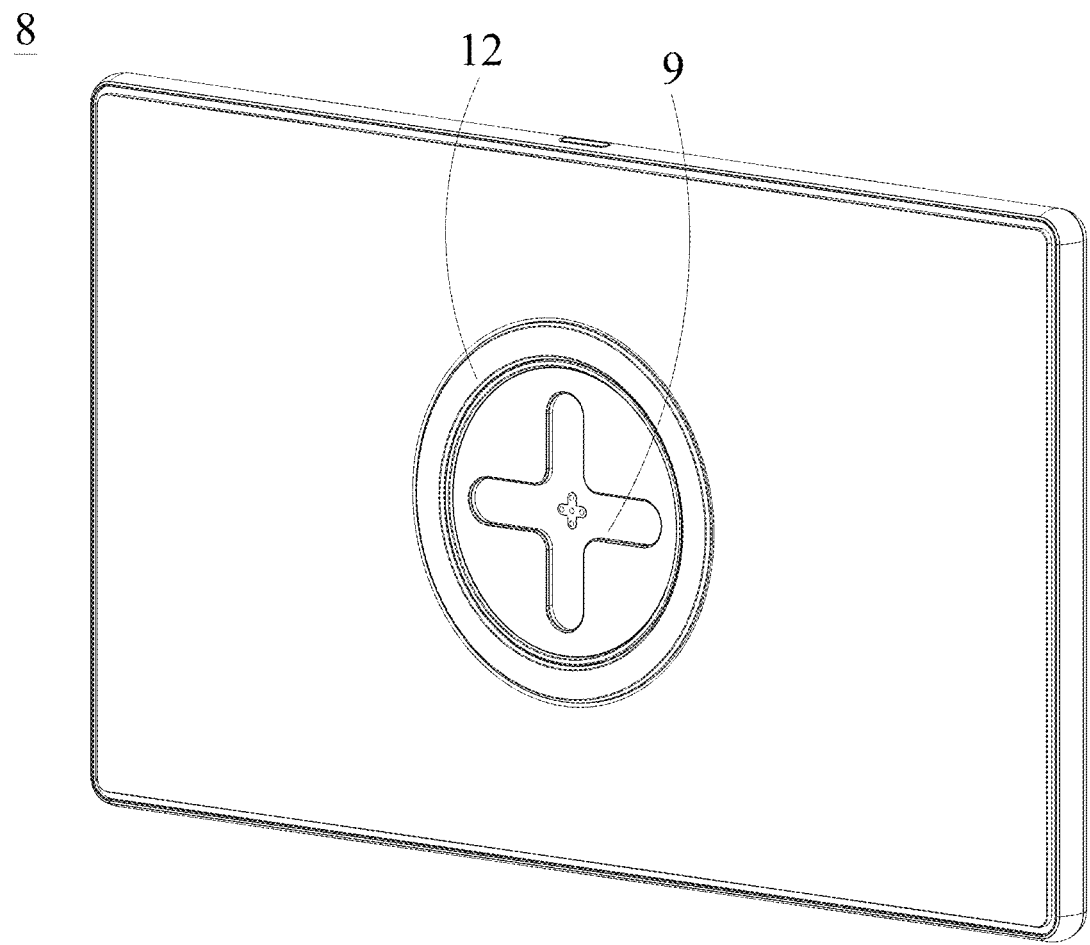
FIG. 6 is a schematic diagram in which the display is further disposed with a ring magnet in the vehicle rear seat display module according to the present disclosure.
Figure 7:
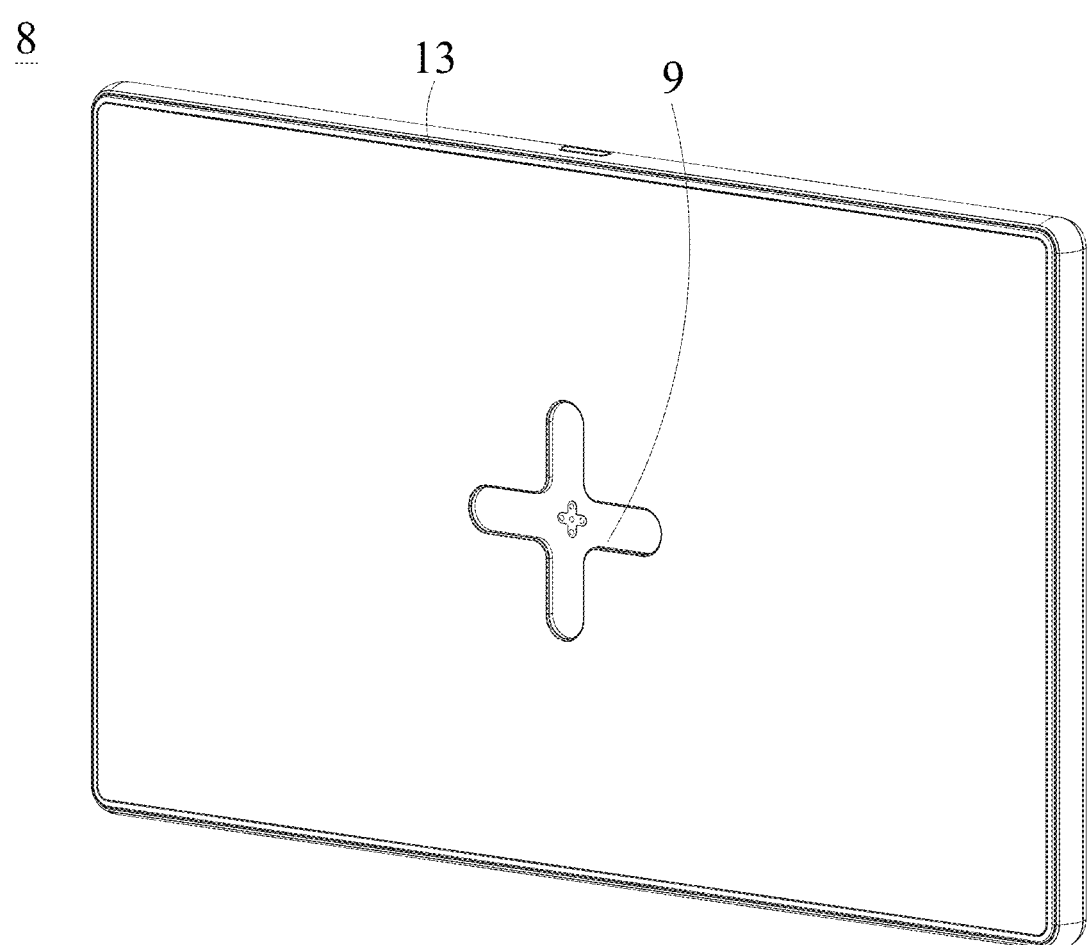
FIG. 7 is a schematic diagram in which the display is further disposed with an ambient light in the vehicle rear seat display module according to the present disclosure.
Figure 8:
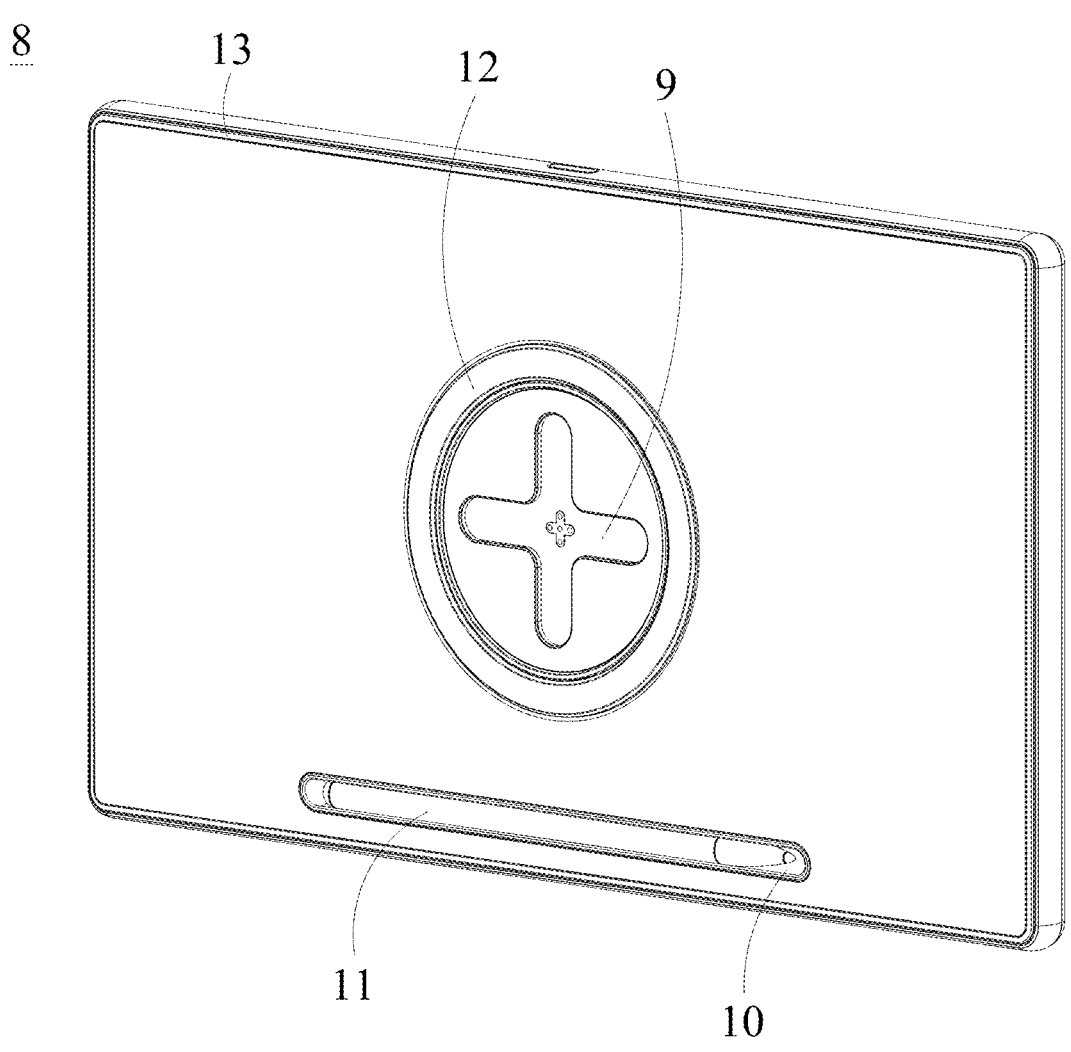
FIG. 8 is a schematic diagram in which the display is further disposed with a pen slot, stylus, a ring magnet, and an ambient light in the vehicle rear seat display module according to the present disclosure.
Figure 9:
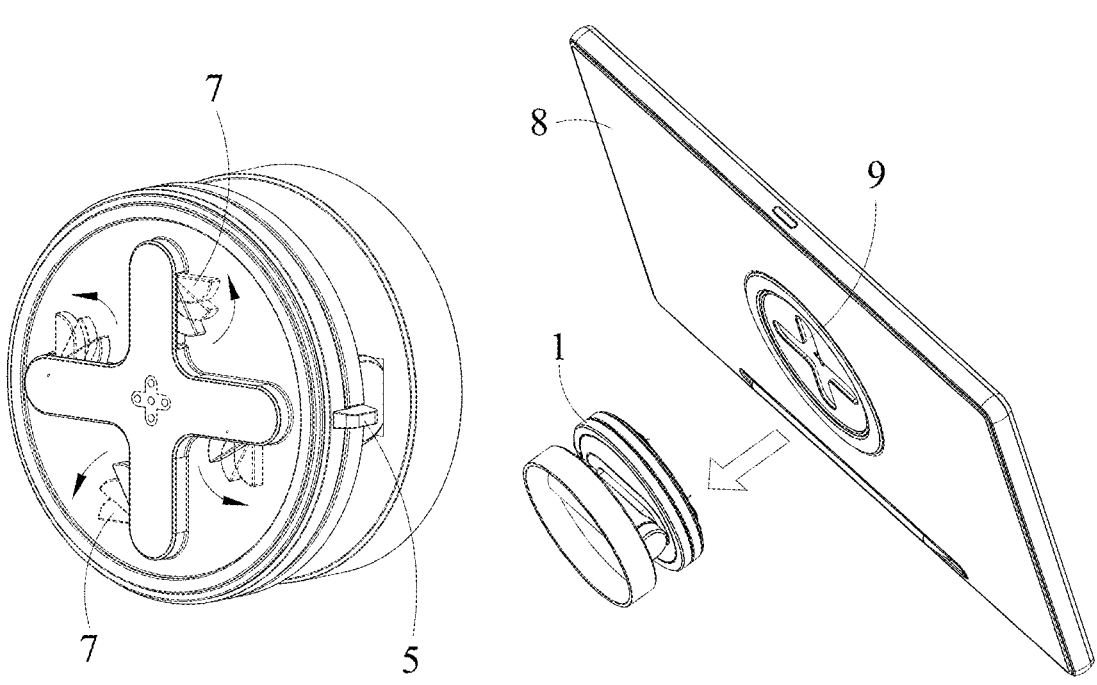
FIG. 9 is a schematic diagram of the operation in which the display is attached with a quick-release structure in the vehicle rear seat display module according to the present disclosure.
Figure 10:
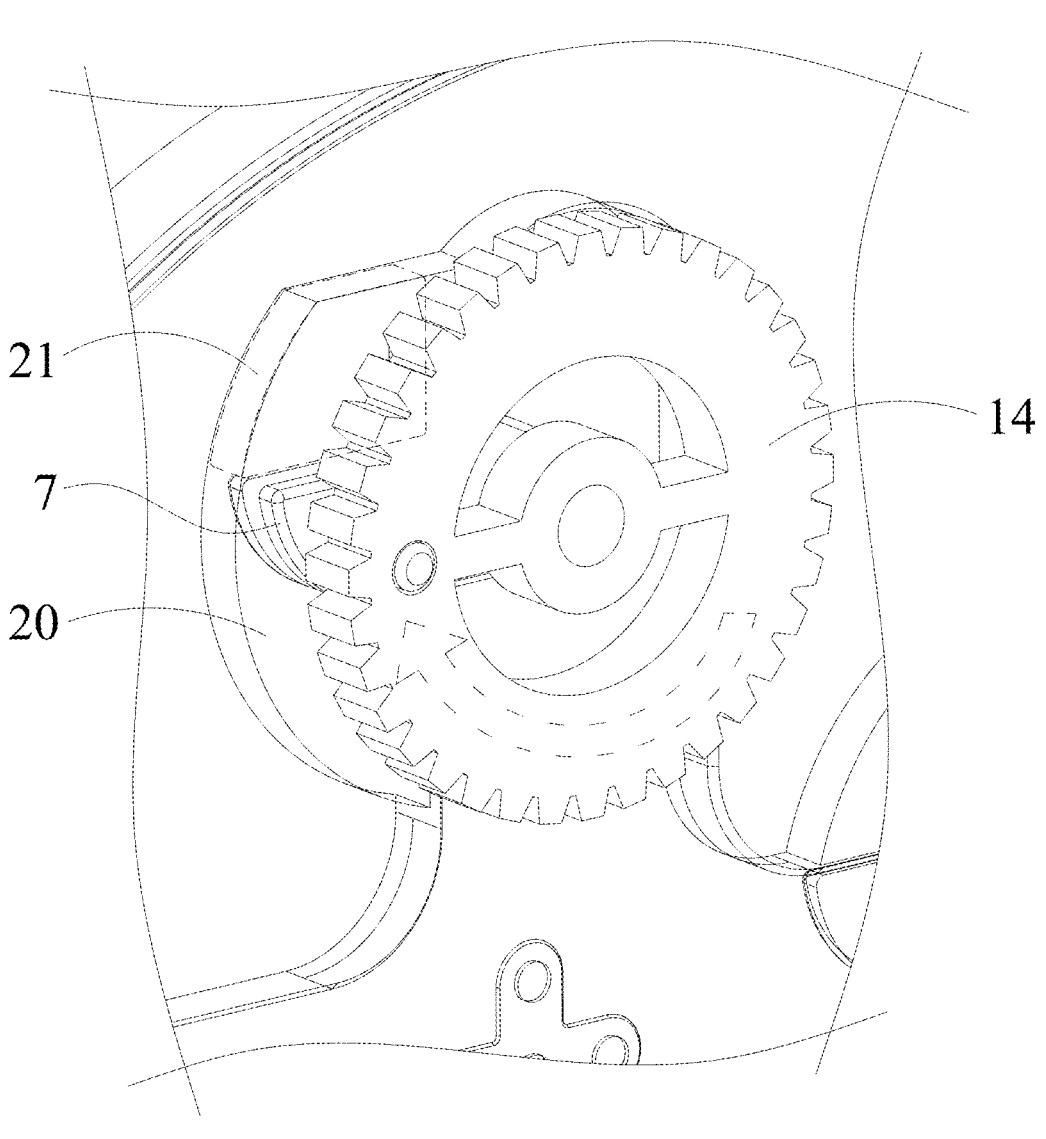
FIG. 10 is a schematic diagram in which the buckles is fixed by attaching the magnets when the display is combined with the quick-release structure in the vehicle rear seat display module according to the present disclosure.
Figure 11:
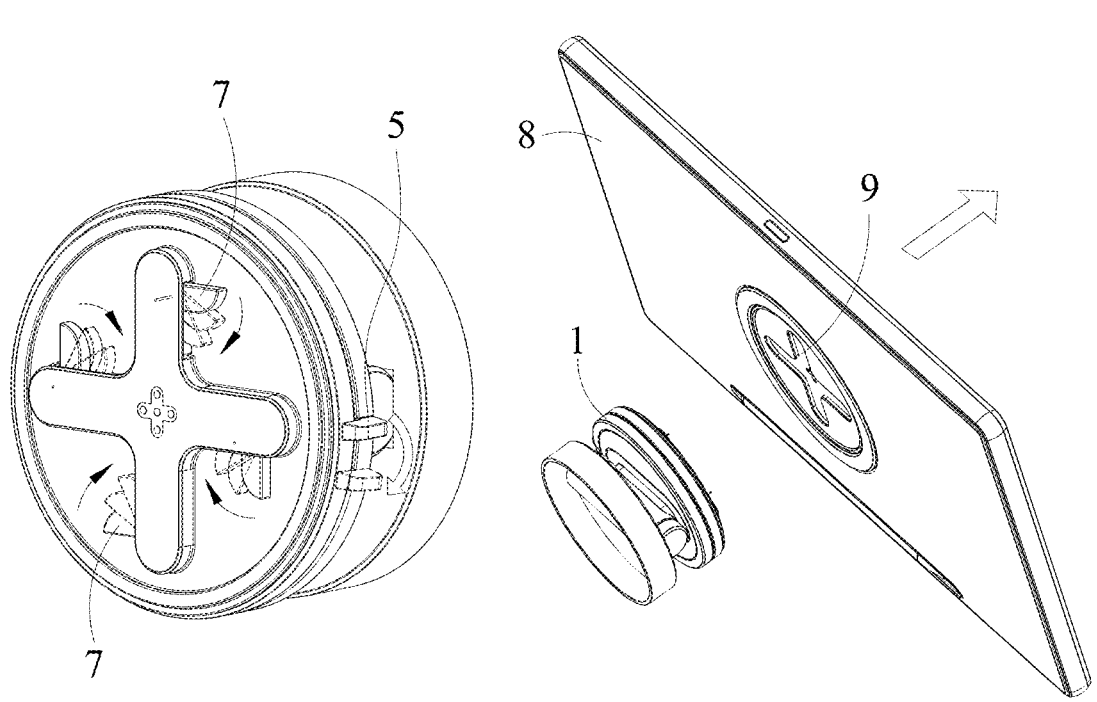
FIG. 11 is a schematic diagram of the operation in which the display is detached with a quick-release structure in the vehicle rear seat display module according to the present disclosure.
Figure 12:
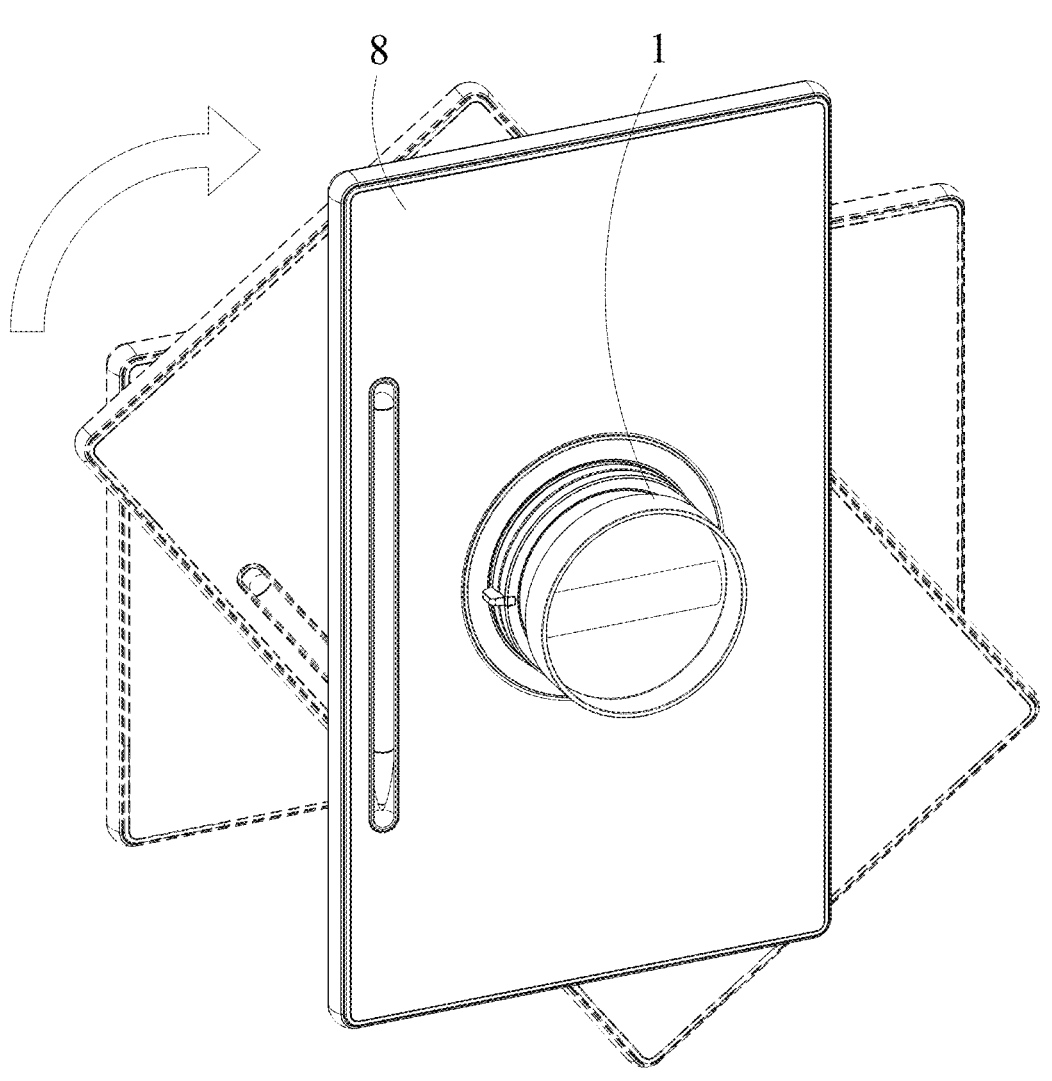
FIG. 12 is a schematic diagram of the operation in which the display is changed from a horizontal placement to a vertical placement through the quick-release mechanism in the vehicle rear seat display module according to the present disclosure.

Please refer to FIG. 1 and FIG. 2, which are respectively a schematic diagram and a perspective diagram of the quick-release structure according to the present disclosure. The quick-release structure 1 includes a display docking piece 2, a fixing bracket docking piece 3, and a connecting hinge 4. The connecting hinge 4 is disposed between the display docking piece 2 and the fixing bracket docking piece 3, so that the display docking piece 2 and the fixing bracket docking piece 3 are moved relative to each other.

The display docking piece 2 includes a release button 5, a cross-convex part 6, a plurality of buckles 7, a plurality of first gears 14, a second gear 15, a rotating mechanism 18 and a fixed shaft 19, and the display docking piece 2 includes a front housing 16 and a rear housing 17, the rear housing 17 is disposed between the front housing 16 and the connecting hinge 4; wherein the release button 5 may be removably disposed on the side of the front housing 16, and is interconnected with the second gear 15 disposed at outside of internal of the front housing 16, the cross-convex part 6 is disposed on another side of the front housing 16 relative to the connecting hinge 4; the plurality of buckles 7 are retractably and respectively disposed at four side ends of the cross-convex part 6, and respectively interconnected with the plurality of first gears 14 disposed inside the front housing 16. The plurality of first gears 14 are respectively meshed with the second gear 15, and thus when the release button 5 is pulled to rotate the second gear 15, since the plurality of first gears 14 and the second gear 15 are meshed, the plurality of first gears 14 and the second gear 15 are linking-up with each other, in order to make the plurality of buckles 7 in a retracted or extended state. The rotating mechanism 18 is disposed inside the front housing 16 and between the plurality of first gears 14 and the rear housing 17, there is a circular cavity in the center of the rotating mechanism 18, and the fixed shaft 19 is disposed on the rear housing 17, by interlocking the fixed shaft 19 with the circular cavity at the center of the rotating mechanism 18, the front housing 16 and the rear housing 17 are interlocked with each other to form the display docking piece 2, and the rotating mechanism 18 may rotate along the fixed shaft 19, which may further rotate the surface of the display docking piece 2 where the cross-convex part 6 is disposed.

The plurality of buckles 7 are made of magnetic metal material, and the connecting hinge 4 and the rotating mechanism 18 may be formed of any conventional structure, the description of which shall not be repeated herein. The display docking piece 2 is used to fix the display thereon, and the fixing bracket docking piece 3 is used to fix the quick-release structure 1 to the back of a vehicle seat.

Preferably, the quick-release structure 1 is made of magnetic metal material, so that the display with a magnetic back cover may be further securely placed on the quick-release structure 1 without easily falling off.

Preferably, a spring-type connector (POGO PIN) is further disposed on the cross-convex part 6, so that a display, also having a back cover of a spring-type connector, may be charged, used for data transmission, or used to operate in-vehicle equipment, after being secured to the display docking piece 2.

Please also refer to FIG. 3 to FIG. 12, which in sequence are a rear view of the display and a perspective view of the cross-snap slot on the back surface of the display, a schematic diagram in which the display is respectively or simultaneously further disposed with a pen slot and a stylus, a ring magnet, and an ambient light, which shows the buckles is fixed by attaching the magnets when the display is combined with the quick-release structure, a schematic diagram of the operation in which the display is attached or detached with a quick-release structure, and a schematic diagram of the operation in which the display is changed from a horizontal placement to a vertical placement through the quick-release mechanism in the vehicle rear seat display module according to the present disclosure.

The vehicle rear seat display module includes the quick-release structure 1 and display 8 as mentioned above, wherein the display 8 includes a cross-snap slot 9, a plurality of recessed parts 20 and a plurality of magnets 21, the cross-snap slot 9 is disposed at the center of the back cover of the display, the plurality of recessed parts 20 are disposed in sequence between each end of cross of the cross-snap slot 9 and the back cover of the display 8, and the plurality of magnets 21 are disposed at the inner side of the plurality of recessed parts 20, and the plurality of recessed parts 20 serve as movement spaces for the buckles 7 to retract.

After the display 8 is interlocked with the cross-convex part 6 of the display docking piece 2 of the quick-release structure 1 via the cross-snap slot 9, the display 8 is fixed to the quick-release structure 1 by attaching the plurality of magnets 21 to the plurality of buckles 7 at four side ends of the cross-convex part 6.

The pitch angle of the display 8 may be adjusted via the connecting hinge 4 of the quick-release structure 1. In addition, the rotating mechanism 18 of the quick-release structure 1 that may rotate along the fixed shaft 19 (referring to FIG. 2) is used to rotate the display 8 fixed by the display docking piece 2 (referring to FIG. 12), so that the display 8 is changed from a horizontal placement to a vertical placement, thus improving the video viewing experience.

When the display 8 is to be fixed with the quick-release mechanism 1, the cross-snap slot 9 and the cross-convex part 6 are interlocked with each other. When the cross-convex part 6 is fully interlocked in the cross-snap slot 9, the plurality of buckles 7 at the four side ends of the cross-convex part 6 are attracted to make them in an expanded state via the magnetic force of the plurality of magnets 21 at the inner side of the plurality of recessed parts 20 (referring to FIG. 9 and FIG. 10), so as to fix the display 8 on the quick-release mechanism 1.

When the display 8 is to be removed from the quick-release mechanism 1, the release button 5 is first flipped, so that the plurality of buckles 7 are retracted into the cross-convex part 6; the cross-convex part 6 is taken out from the cross-snap slot 9 (referring to FIG. 11), so the display 8 may be separated from the quick-release mechanism 1.

Preferably, the display 8 may further include a pen slot 10 and a stylus 11 (referring to FIG. 5), the pen slot 10 is disposed under the back cover of the display 8, and the stylus 11 is removably disposed in the pen slot 10, so that the display 8 may come with the function of document processing in addition to being used for video watching.

Preferably, the display 8 may further include a ring magnet 12 (referring to FIG. 6), and the ring magnet 12 is disposed along the outer side of the cross-snap slot 9. The display 8 may be placed on the quick-release structure 1 more securely without easily falling off by using the ring magnet 12, or when the display 8 is removed for use, the ring magnet 12 is used to attach the display 8 to other surfaces with a magnetic function, making it more convenient for users to use the display for multifunctional purposes.

Preferably, the display 8 further includes an ambient light 13 (referring to FIG. 7), and the ambient light 13 is disposed along the peripheral edge of the back cover of the display 8; the ambient light 13 may be used to enhance the user experience with different lighting effects according to usage scenarios.

Preferably, when the first spring-type connector is disposed on the cross-convex part 6 on the quick-release mechanism 1, the second spring-type connector (POGO PIN) may be further disposed on the cross-snap slot 9 of the display 8 correspondingly, in order to charge the display 8, transmit data, or operate in-vehicle equipment using the display.

More preferably, any one or more of the pen slot 10, the stylus 11, the ring magnet 12, the ambient light 13, and the second spring-type connector may be disposed on the display 8 either individually or simultaneously depending on the requirement (referring to FIG. 5 to FIG. 8).

In summary, by means of the quick-release structure and the vehicle rear seat display module using the same provided in the present disclosure, when a display is fixed to the back of a vehicle seat, the display may be viewed horizontally or horizontally, or the display may be removed and held in the hand for use, thus enabling the vehicle display to achieve multifunctional purposes.

The embodiments of the present disclosure covered by the patent application are defined by the present claims, not by the summary of the invention. The summary of the invention is a high-level generalization of the various aspects of the present disclosure and introduces some concepts further described in the following detailed description. The summary of the invention is not intended to identify the essential or necessary features of the claimed subject matter, nor is it intended to be used solely to define the claimed subject matter. The subject matter should be understood by reference to the entire specification, any or all of the drawings, and the appropriate portion of every claim of the present disclosure.

What is claimed is:

1. A quick-release structure, comprising:
a display docking piece;
a fixing bracket docking piece; and
a connecting hinge, disposed between the display docking piece and the fixing bracket docking piece, so that the display docking piece and the fixing bracket docking piece are moved relative to each other, wherein
the display docking piece comprises:
   a front housing;
   a rear housing, disposed between the front housing and the connecting hinge and is provided with a fixed shaft;
   a release button, removably disposed on a side of the front housing, and is interconnected with a second gear disposed at outside of internal of the front housing;
   a cross-convex part, disposed on another side of the front housing relative to the connecting hinge;
   a plurality of buckles, retractably and respectively disposed at four side ends of the cross-convex part and respectively interconnected with a plurality of first gears disposed inside the front housing, and the plurality of first gears are respectively meshed with the second gear; and
   a rotating mechanism, disposed inside the front housing and between the plurality of first gears and the rear housing, there is a circular cavity in the center of the rotating mechanism, and by interlocking the fixed shaft with the circular cavity, the front housing and the rear housing are interlocked with each other to form the display docking piece, and the rotating mechanism rotates along the fixed shaft, which further rotates a surface of the display docking piece where the cross-convex part is disposed.

2. The quick-release structure according to claim 1, wherein the quick-release structure is made of magnetic metal material.

3. The quick-release structure according to claim 1, wherein the fixing bracket docking piece is used to fix the quick-release structure to a back of a vehicle seat.

4. The quick-release structure according to claim 1, wherein a spring-type connector (POGO PIN) is further disposed on the cross-convex part.

5. A vehicle rear seat display module, comprising:
a quick-release structure comprising:
   a display docking piece;
   a fixing bracket docking piece; and
   a connecting hinge, disposed between the display docking piece and the fixing bracket docking piece, so that the display docking piece and the fixing bracket docking piece are moved relative to each other,
   the display docking piece comprising:
      a release button, removably disposed on a side of the display docking piece;
      a cross-convex part, disposed on another side of the display docking piece relative to the connecting hinge;
      a plurality of buckles, retractably and respectively disposed at four side ends of the cross-convex part and interconnected with the release button; and
      a rotating mechanism, disposed inside the display docking piece which rotates a surface of the display docking piece where the cross-convex part is disposed; and
a display, comprising:
   a cross-snap slot, disposed at a center of a back cover of the display;
   a plurality of recessed parts, disposed in sequence between each end of cross of the cross-snap slot and the back cover of the display;
   a plurality of magnets, disposed at an inner side of the plurality of recessed parts, wherein
   after the display is interlocked with the cross-convex part of the display docking piece of the quick-release structure via the cross-snap slot, the display is fixed to the quick-release structure by attaching the plurality of magnets to the plurality of buckles at four side ends of the cross-convex part.

6. The vehicle rear seat display module according to claim 5, wherein a pitch angle of the display is adjusted via connecting hinge of the quick-release structure.

7. The vehicle rear seat display module according to claim 5, wherein the rotating mechanism of the quick-release structure rotates along the fixed shaft to rotate the display fixed by the display docking piece, so that the display is changed from a horizontal placement to a vertical placement.

8. The vehicle rear seat display module according to claim 5, wherein the display further comprises:
a pen slot, disposed under the back cover of the display; and
a stylus, removably disposed in the pen slot.

9. The vehicle rear seat display module according to claim 5, wherein the display further comprises a ring magnet disposed along an outer side of the cross-snap slot.

10. The vehicle rear seat display module according to claim 5, wherein the display further comprises an ambient light disposed along a peripheral edge of the back cover of the display.

11. The vehicle rear seat display module according to claim 5, wherein a spring-type connector (POGO PIN) is further disposed on the cross-snap slot.

12. The vehicle rear seat display module according to claim 5, wherein the quick-release structure is made of magnetic metal material.

13. The vehicle rear seat display module according to claim 5, wherein the fixing bracket docking piece is used to fix the quick-release structure to a back of a vehicle seat.

* * * * *